Patented Apr. 23, 1946

UNITED STATES PATENT OFFICE 2,399,156

2,399,156

TREATMENT OF RUBBER

Paul Stamberger, Philadelphia, Roderick Koenig Eskew, Glenside, and Roy S. Hanslick, Philadelphia, Pa., assignors to the United States of America, as represented by the Secretary of Agriculture No Drawing. Application June 15, 1944, Serial No. 540,500

3 Claims. (Cl. 260—817)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

The present invention relates to a treatment of raw resinous rubber which has been recovered from rubber-bearing plants, such as guayule and Russian dandelion.

An object of the invention is to purify the raw rubber, resulting in a rubber which is relatively free from residual plant tissues. Other objects are to improve the physical properties of the vulcanizates made from the purified rubber, to increase the rubber hydrocarbon content, and to improve the keeping and aging qualities of the purified rubber.

Rubber obtained from the plants by disintegrating the rubber-bearing tissue by mechanical means, for example, by pebble milling, is contaminated with remnants of plant tissues. The rubber is conventionally freed from the larger portion of the disintegrated plant tissue by flotation. In order to waterlog the cork in the flotation process, it is customary to subject the contaminated rubber to a hydrostatic pressure of about 250 lbs. per square inch at a temperature of about 200° F. In the subsequent flotation, the water logged cork sinks and the raw rubber, in the form of a tangled, wormy mass, floats. Rubber obtained by this treatment contains a considerable amount of water (50 percent to 60 percent), and requires drying at an elevated temperature in vacuum or in circulated air. The amount of plant impurities present in this rubber is yet very high. For example, guayule rubber obtained by such process contains 10 percent to 15 percent residual plant debris. Consequently, unless the debris is removed, the tensile strength and other physical properties of the rubber are impaired.

We have discovered that the raw resinous rubber can be very effectively freed from this residual plant debris by treatment with an alkali metal hydroxide solution, for example, by heating with a dilute aqueous (1 percent to 10 percent) NaOH solution, followed by removing the liquid and drying the rubber. The purified rubber obtained in this manner has a considerably reduced content of the residual debris, and vulcanized compounds prepared from it have improved physical properties. However, we have found that the tendency for deterioration on drying and storing of the alkaline treated rubber makes a practical application of such process of little value. We attribute this deterioration to the small amount of residual alkali which is strongly retained by the rubber and cannot be removed even by prolonged water washing.

This invention is based on the discovery that neutralization of this residual alkali in a particular manner and with certain classes of acids will eliminate this tendency for rapid deterioration, and that this neutralization when combined with the alkali treatment already mentioned yields a product with greatly improved properties. We have also found that an additional reduction in the plant debris can be effected if the neutralization process is combined with a scrubbing operation, and that the quantity of debris can be more effectively reduced by using acids, the alkali salts of which form detergents during the neutralization and scrubbing process.

According to our invention, the wet raw rubber obtained from the flotation process above described is placed in a container with a dilute alkali metal hydroxide solution and heated, preferably from about 30 minutes to 120 minutes, at a temperature of about from 180° to 212° F. The amount of solution used for such a treatment should be at least sufficient to cover the rubber and to make stirring and mixing of the mass possible. An equal quantity of wet crude rubber and solution by weight is satisfactory. The strength of the solution can vary within a wide range, for example, about from 0.5 percent to 20 percent, but about from 0.5 percent to 5 percent is a preferable concentration. The lower the concentration, however, the longer the time and also the higher the temperature required in the treatment. At the end of the treatment, the dark-colored caustic solution is separated from the mass by flotation and screening, after which the screened rubber can be washed with water.

If at this stage the rubber is dried, at elevated temperature of about from 140° to 180° F., it will soon lose its firmness and elasticity, becoming soft and tacky, thus showing the usual signs of deterioration of rubber. Without heating in the drying operation, the same deterioration will be observed during storage at room temperature within from 10 days to 60 days. The addition of an age resister (antioxidant) does not effectively alter this behavior.

Attempts to remove the residual alkali by washing with 100 to 1,000 times the quantity of water originally used does not change the behavior on drying and storing. We attribute this fact to the porous structure of the rubber and its tendency to retain alkali.

According to this invention, an acid of definite nature is brought into intimate contact with this porous structure, whereby the alkali is neutralized. The acid used for this neutralization is of such nature that either it is removed in the drying process by evaporation, or if it remains with the rubber it has no harmful effect thereon.

Formic acid is an example of volatile acid which is removed by evaporation during the drying process, and good results are obtained with it. However, since its alkali salts have no detergent action, the maximum reduction in impurities is not obtained.

Certain water-insoluble acids, for example, higher fatty acids, are quite satisfactory acids of the type which are not removed in the drying process. Water-soluble acids cannot be used, because their presence in the rubber will retard vulcanization and have a deteriorating effect on the final quality of the vulcanized rubber.

The best results are obtained by use of a fine dispersion, suspension or emulsion of a water-insoluble acid which forms with the alkali metal hydroxide an alkali salt (soap-forming acid) with the properties of a detergent. The higher fatty acids, for example, palmitic, stearic, lauric and oleic acid, and the like, are examples of such soap-forming acids. The water dispersion, suspension or emulsion should be of sufficiently fine distribution so that the alkali-treated rubber can be brought into intimate contact with the acidic material in the suspension. A preferable method of perfecting the contact is by scrubbing the rubber with the suspension in a pebble mill, preferably for about from 5 minutes to 20 minutes at a temperature of approximately 140° to 180° F. The quantity of acid dispersion should be such that an effective scrubbing operation is possible, one part of the wet alkali-treated rubber to two parts of the dispersion being a favorable ratio. The quantity of acid should be at least sufficient that the pH of the liquid after the scrubbing operation will be near the neutral point, indicating that the alkali is fully neutralized. However, it is advisable to use an excess of insoluble acid for the neutralization.

The following examples illustrate the process in greater detail.

Example I 1,000 parts of wet guayule raw rubber obtained by flotation as described above and containing 60 percent of water was boiled for 30 minutes with 2,000 parts by weight of a 3 percent sodium hydroxide solution. The solution was then drained off to remove a substantial part thereof and the wet rubber was pebble-mill scrubbed for 10 minutes at 170° F. with 2,000 parts of a water dispersion containing 2 percent stearic acid. The mass was then screened, washed with water and dried in the usual manner to produce the purified rubber.

The effect of this treatment on the debris fraction and on the tensile strength of the vulcanizate compounded from the purified rubber is shown in the following table:

| Guayule rubber | Debris fraction, percent | Tensile strength of the vulcanizate, lbs. per sq. in. |
| --- | --- | --- |
| Before treatment | 10.30 | 2,400 |
| After treatment | 3.20 | |
| After NaOH and stearic acid treatments | 1.50 | 3,100 |

The insoluble fatty acid can be replaced with a water-soluble, volatile, organic acid which will evaporate on drying, as for example, formic acid, as shown in the following example:

Example II

The raw rubber treated with caustic as described in Example I was pebble-mill scrubber for 10 minutes at 170° F. with 2,000 parts of a 0.1 percent solution of formic acid, the details of the treatment being similar to those of Example I. This reduced the debris fraction to 2.60 percent. The rubber mass was then dried. The purified rubber showed no tendency to become tacky on aging.

The treatment of this invention can also be combined with a deresinating treatment, as shown by the following example:

Example III

As a first case, guayule raw rubber comparable to that used in Example I was extracted at elevated temperature with a solution of sodium hydroxide in ethyl alcohol for the simultaneous removal of plant debris and extraction of the resins by the alcohol. The residual caustic in the rubber was then neutralized by a treatment with a stearic acid dispersion, as described in Example I.

It is possible, as a second case, first to extract the resins with the solvent and then to heat the extracted rubber with the sodium hydroxide solution, after which the scrubbing operation in a water dispersion of a soap-forming fatty acid can be carried out.

In this manner, a lengthy water washing is replaced by a short neutralization process. The pH of the water extract of such a neutralized solution was found to be lower than the pH of the water washed rubber, although in both cases the washing water was nearly neutral at the point of completion of the washing.

The following table illustrates the advantages of such an additional treatment of the rubber with a stearic acid dispersion after deresination with a 2 percent NaOH solution in ethyl alcohol, the extracted rubber having been pebble-mill scrubbed for 20 minutes at 170° F. with the stearic acid dispersion.

| Guayule rubber | pH of wash water | pH of the water extract of the rubber after treatment | Resins, per cent | Free stearic acid, per cent | Debris fraction, per cent |
| --- | --- | --- | --- | --- | --- |
| Before treatment | | | 17.28 | | 6.86 |
| After NaOH and alcohol treatment | 7.3 | 9.1 | 2.40 | | 2.26 |
| After NaOH and alcohol treatment, followed by stearic acid treatment | 7.3 | 8.3 | 2.68 | 3 | 1.70 |

The improved aging properties of the vulcanizate compounded from the purified rubber of the table above are shown in the following table:

| | Physical test before aging | | Physical test after aging for 72 hrs. at 70° C. and 300 lbs. per sq. in. O₂ pressure | |
| --- | --- | --- | --- | --- |
| | Optimum tensile strength of the vulcanizate, lbs. per sq. in. | Elongation, per cent | Optimum tensile strength of the vulcanizate, lbs. per sq. in. | Elongation, per cent |
| Before treatment | 3,010 | 920 | 2,780 | 870 |
| After NaOH and alcohol treatment, followed by stearic acid treatment | 3,110 | 800 | 3,650 | 740 |

In compounding the rubber of the three preceding examples, A. S. T. M. standards with the following formula were used:

| | Parts |
|---|---|
| Dry rubber | 100.0 |
| Zinc oxide | 5.0 |
| Sulphur | 3.5 |
| Mercaptobenzothiazol | 1.0 |
| Stearic acid | 1.5 |

Example IV

Substantially the same results were obtained with rubber processed from kok-saghyz (Russian dandelion) roots. The rubber obtained was treated with a 3 percent NaOH solution in water in a manner identical to the treatment in Example I. The results are given in the following table:

| Kok-saghyz rubber | Debris fraction, percent | Optimum tensile strength of the vulcanizate, lbs. per sq. in. |
|---|---|---|
| Before treatment | 12.08 | 2,100 |
| After NaOH treatment and wash | 7.62 | |
| After NaOH and stearic acid treatments | 5.10 | 2,700 |

The formula used for compounding the rubber in this example was as follows:

| | Parts |
|---|---|
| Rubber | 100.0 |
| Zinc oxide | 5.0 |
| Sulphur | 3.5 |
| Mercaptobenzothiazol | 0.5 |
| Stearic acid | 4.0 |

The improvement in the overall properties of the rubber treated according to the present invention was also obtained with landolphia rubber, as demonstrated by the following example:

Example V

Raw rubber was obtained from the roots of the plant by mechanical means in a manner similar to that for obtaining guayule rubber. Certain plant constituents remaining in this raw rubber have a very pronounced retarding effect on the vulcanization of the rubber compound, and ordinarily it is very difficult to obtain a useful product therefrom. However, these constituents, as well as other plant debris, are removed by treatment with sodium hydroxide solution and subsequent neutralization with stearic acid by scrubbing in a manner similar to that of Example I.

Such a purified rubber shows normal behavior on vulcanization, in addition to the improvement in purity. The results of the chemical analysis and the improvement in the physical properties of the vulcanizates and in the rate of cure are given in the following table:

| Landolphia rubber | Debris fraction, per cent | Optimum cure time and temp. | Tensile strength of the vulcanizate, lbs. per sq. in. | Elongation, per cent |
|---|---|---|---|---|
| Before treatment | 5.77 | 180 min. at 274° F. | 1,730 | 970 |
| After NaOH and stearic acid treatments | 1.47 | 20 min. at 274° F. | 3,640 | 720 |

The wet purified rubber for this experiment was dried at 140° F. in vacuum before compounding. For preparing the compound for vulcanization and physical tests, the following formula was used:

| | Parts |
|---|---|
| Rubber | 100.0 |
| Zinc oxide | 5.0 |
| Sulphur | 3.5 |
| Mercaptobenzothiazol | 1.0 |
| Stearic acid | 1.5 |

The pH of the water extract of the combined caustic and stearic acid treated rubber was 7.2.

Having thus described the invention, what is claimed is:

1. A process for purifying raw resinous rubber selected from the group consisting of guayule and dandelion comprising treating the raw resinous rubber by mixing it with a hot alkali metal hydroxide solution, removing a substantial part of the solution from the treated rubber, then scrubbing the treated rubber with a hot water dispersion of a water-insoluble higher fatty acid which forms a soap with the alkali metal hydroxide, the quantity of acid used being at least sufficient to neutralize the residual alkali retained by the treated rubber, and then washing and drying the treated rubber.

2. The process of claim 1, wherein the acid is stearic acid.

3. A process for purifying raw resinous rubber selected from the group consisting of guayule and dandelion comprising extracting the resins with ethyl alcohol and treating the raw rubber by mixing it with a hot alkali metal hydroxide solution, removing a substantial part of the solution from the treated rubber, then scrubbing the treated rubber with a hot water dispersion of a water-insoluble higher fatty acid which forms a soap with the alkali metal hydroxide, the quantity of acid used being at least sufficient to neutralize the residual alkali retained by the treated rubber, and then washing and drying the treated rubber.

PAUL STAMBERGER.
RODERICK KOENIG ESKEW.
ROY S. HANSLICK.